United States Patent
Kunkes et al.

(10) Patent No.: US 11,214,493 B2
(45) Date of Patent: Jan. 4, 2022

(54) ACCELERATED ALUMINOSILICATE ZEOLITE CRYSTALLIZATION

(71) Applicant: BASF Corporation, Florham Park, NJ (US)

(72) Inventors: Eduard Kunkes, New Brunswick, NJ (US); Ahmad Moini, Princeton, NJ (US); Maritza I. Ortega, Paterson, NJ (US)

(73) Assignee: BASF CORPORATION, Florham Park, NJ (US)

( * ) Notice: Subject to any disclaimer, the term of this patent is extended or adjusted under 35 U.S.C. 154(b) by 0 days.

(21) Appl. No.: 16/467,716

(22) PCT Filed: Dec. 7, 2017

(86) PCT No.: PCT/IB2017/057740
§ 371 (c)(1),
(2) Date: Jun. 7, 2019

(87) PCT Pub. No.: WO2018/104913
PCT Pub. Date: Jun. 14, 2018

(65) Prior Publication Data
US 2020/0010331 A1 Jan. 9, 2020

Related U.S. Application Data

(60) Provisional application No. 62/431,560, filed on Dec. 8, 2016.

(51) Int. Cl.
*C01B 39/48* (2006.01)
*C01B 39/14* (2006.01)
(Continued)

(52) U.S. Cl.
CPC ............ *C01B 39/48* (2013.01); *B01J 29/50* (2013.01); *B01J 29/70* (2013.01); *B01J 29/7003* (2013.01);
(Continued)

(58) Field of Classification Search
CPC ..... C01B 39/145; C01B 39/305; C01B 39/48; B01J 29/50; B01J 29/70; B01J 29/7003;
(Continued)

(56) References Cited

U.S. PATENT DOCUMENTS 4,606,899 A * 8/1986 Butter ................... C01B 39/22
423/709
7,112,316 B1 * 9/2006 Konrad .................. C01B 39/04
423/306

(Continued)

FOREIGN PATENT DOCUMENTS

KR 20030091263 12/2003
KR 20030091263 A * 12/2003
(Continued)

OTHER PUBLICATIONS

Liu et al.,"Widening Synthesis Bottlenecks:Realization of Ultrafast andContinuous-FlowSynthesis of High-Silica Zeolite SSZ-13 for NOxRemoval" Angew.Chem. Int.Ed. 2015, 54,5683-5687 (Year: 2015).*

(Continued)

*Primary Examiner* — David M Brunsman
(74) *Attorney, Agent, or Firm* — Finnegan, Henderson, Farabow, Garrett & Dunner LLP

(57) ABSTRACT

A method for crystallizing aluminosilicate zeolites, including the steps of preparing a mixture containing a silica source, a mineralizing agent, an organic structure directing agent; heating the mixture to form a heated mixture; and adding an alumina source to the heated mixture. The method (Continued)

steps described herein can provide an accelerated aluminosilicate zeolite crystallization process as compared to conventional processes.

30 Claims, 4 Drawing Sheets

(51) Int. Cl.
  *C01B 39/30* (2006.01)
  *B01J 29/70* (2006.01)
  *B01J 29/50* (2006.01)
  *B01J 29/76* (2006.01)
  *B01J 37/08* (2006.01)
  *B01J 37/30* (2006.01)
  *B01J 37/10* (2006.01)

(52) U.S. Cl.
  CPC ....... *B01J 29/7007* (2013.01); *B01J 29/7015* (2013.01); *B01J 29/763* (2013.01); *B01J 37/08* (2013.01); *B01J 37/10* (2013.01); *B01J 37/30* (2013.01); *C01B 39/145* (2013.01); *C01B 39/305* (2013.01); *C01P 2002/72* (2013.01); *C01P 2004/03* (2013.01); *C01P 2006/12* (2013.01)

(58) Field of Classification Search
  CPC .... B01J 29/7007; B01J 37/10; B01J 29/7015; C01P 2006/12
  See application file for complete search history.

(56) References Cited

U.S. PATENT DOCUMENTS

| | | | |
|---|---|---|---|
| 7,597,874 B1* | 10/2009 | Miller | C01B 39/48 423/700 |
| 7,648,694 B2* | 1/2010 | Burton, Jr. | B01J 29/70 423/704 |
| 9,796,596 B2* | 10/2017 | Liu | C01B 39/48 |
| 10,669,157 B2* | 6/2020 | Itabashi | B01J 29/7007 |
| 2002/0090337 A1 | 7/2002 | Corma Canos et al. | |
| 2005/0118151 A1* | 6/2005 | Larsen | G01N 33/6893 424/93.21 |
| 2009/0060835 A1 | 3/2009 | Burton, Jr. | |
| 2013/0052125 A1* | 2/2013 | Moini | B01J 29/7015 423/700 |
| 2016/0068402 A1 | 3/2016 | Liu et al. | |
| 2016/0068403 A1* | 3/2016 | Liu | C01B 39/48 423/704 |
| 2019/0225500 A1* | 7/2019 | Kunkes | B01J 37/04 |

FOREIGN PATENT DOCUMENTS

| | | |
|---|---|---|
| WO | WO 2010/008755 | 1/2010 |
| WO | WO 2014/092870 A1 | 6/2014 |
| WO | WO 2018/065885 A1 | 4/2018 |

OTHER PUBLICATIONS

Liu et al, "Supporting Information", anie_201501160_sm_miscellaneous_information.pdf (Year: 2015).*
Lobo et al, "Structure-Direction in Zeolite Synthesis" Journal of Inclusion Phenomena and Molecular Recognition in Chemistry 21: 47-78, 1995 (Year: 1995).*
Moliner et al, "Towards the Rational Design of Efficient Organic Structure-Directing Agents for Zeolite Synthesis" Angew. Chem. Int. Ed. 2013, 52, 13880-13889 (Year: 2013).*
International Search Report in counterpart PCT/IB2017/057740, dated Apr. 6, 2018 (3 pages).
International Preliminary Report on Patentability in counterpart PCT/IB2017/057740, dated Jun. 11, 2019 (8 pages).
Supplemental Partial European Search Report in counterpart EP 17 878 066, dated Jun. 30, 2020 (3 pages).
European Search Opinion in counterpart EP 17 878 066, dated Aug. 13, 2020 (8 pages).

* cited by examiner

ACCELERATED ALUMINOSILICATE ZEOLITE CRYSTALLIZATION

CROSS-REFERENCE TO RELATED APPLICATIONS

The present application is a U.S. National Stage of International Patent Application PCT/IB2017/057740, filed Dec. 7, 2017 and claims priority to U.S. Provisional Patent Application No. 62/431,560, filed Dec. 8, 2016. The disclosures of each of the applications noted above are incorporated herein by reference in their entireties.

TECHNICAL FIELD OF THE INVENTION

The present disclosure relates to processes for preparing aluminosilicate zeolite crystal compositions. More particularly, the disclosure relates to accelerated crystallization processes for preparing aluminosilicate zeolite crystal compositions.

BACKGROUND OF THE INVENTION

Crystalline aluminosilicate zeolite materials are widely used and have various applications. The standard industrial process for producing crystalline aluminosilicate zeolite materials involves the preparation of an intermediate product composed of a source of silica, a source of alumina, mineralizing agent (e.g., base), and an organic structure directing agent (template). All materials are typically mixed together upfront in a pressure vessel. The pressure vessel is then subjected to hydrothermal conditions in batch mode and the crystallization process takes place.

There is a need in the art to develop accelerated synthesis approaches that will result in crystalline aluminosilicate zeolite having properties similar to those obtained through the standard industrial process, while enabling higher throughput and efficiency.

SUMMARY OF THE INVENTION

Disclosed herein are accelerated zeolite crystallization processes for preparing aluminosilicate zeolite crystal compositions. Such processes generally comprise adding an alumina source, at least in part, after various other components are mixed and/or heated. In some embodiments, the zeolite crystallization process comprises adding an alumina source to a heated mixture such that the added alumina source is consumed. Prior to the start of crystallization and alumina source addition/consumption, the mixture may comprise a silica source, a mineralizing agent, and an organic structure directing agent.

In one aspect of the invention is provided a method of crystallizing zeolites, comprising: preparing a mixture comprising a silica source, a mineralizing agent, an organic structure directing agent, and optionally, zeolite crystals; heating the mixture to form a heated mixture; and adding an alumina source to the heated mixture. In some embodiments, the heating is conducted, at least in part, at an elevated pressure, e.g., at a pressure of at least 1 atmosphere.

In some embodiments, the heated mixture comprises about 75 wt. % or less, about 50 wt. % or less, about 25 wt. % or less, about 10 wt. % or less, or about 5 wt. % or less of the alumina source prior to the adding step, based on the total weight of the alumina source to be added during the method. In some embodiments, the heated mixture is free of the alumina source (and/or free of alumina) prior to the adding step, other than alumina in the optional zeolite crystals.

In some embodiments, the mixture comprises the optional zeolite crystals, and the zeolite crystals have an 8 ring pore size. In some such embodiments, the optional zeolite crystals are seed crystals. For example, the mixture may comprise the optional zeolite crystals, wherein the optional zeolite crystals are aluminosilicate zeolite crystal seeds with an 8 ring pore size, having frameworks selected from the group consisting of AEI, AFX, CHA, LEV, AFT, EAB, KFI, SAT, TSC, SAV, ERI, LTA and combinations thereof. In specific embodiments, the optional zeolite crystals comprise zeolites with CHA frameworks.

The method of adding the alumina source can vary. For example, in some embodiments, the alumina source is added continuously at varying flow rates. In some embodiments, the alumina source is added continuously at an increasing flow rate. In some embodiments, the alumina source is added continuously at a decreasing flow rate. In some embodiments, the alumina source is added instantaneously.

In some embodiments, the method provides a substantially crystallized product in a time period that is less than a comparative time period required to provide a substantially crystallized product in a control process comprising combining the majority of the alumina source (e.g., an amount of about 80 wt. % or more, based on a weight of a total amount of alumina source to be added) with the silica source, mineralizing agent, organic structure directing agent, and optional zeolite crystals. For example, in some embodiments, the time period is about 1.5 times shorter than the comparative time period, about 2 times shorter than the comparative time period, or about 3 times shorter than the comparative time period. In some embodiments, the time period is the time required to obtain about 80% or more crystallinity from the mixture and the alumina source, the time period is the time required to obtain about 85% or more crystallinity from the mixture and the alumina source, the time period is the time required to obtain about 85% or more crystallinity from the mixture and the alumina source, the time period is the time required to obtain about 90% or more crystallinity from the mixture and the alumina source, or the time period is the time required to obtain about 95% or more crystallinity from the mixture and the alumina source.

In some embodiments, the adding step is conducted during about 10% to about 100% of the time period or during about 30% to about 100% of the time period. In some embodiments, the adding step is conducted during about 50% to about 100% of the time period, during about 70% to about 100% of the time period, or the during about 85% of the time period.

The time period (over which the method provides a substantially crystallized product, as described herein above) can, in some embodiments, range from about 1 hour to about 96 hours, from about 2 hours to about 72 hours, from about 3 hours to about 48 hours, from about 5 hours to about 36 hours, from about 6 hours to about 24 hours, from about 7 hours to about 12 hours, or about 10 hours. The comparative time period (over which the control process provides a substantially crystallized product) can, in some embodiments, range from about 3 hours to about 168 hours, from about 10 hours to about 96 hours, from about 15 hours to about 72 hours, from about 20 hours to about 48 hours, or about 30 hours.

The disclosed method, in some embodiments, further comprises calcining to form aluminosilicate zeolite crystals with an 8 ring pore size. The aluminosilicate zeolite crystals can comprise, e.g., zeolites with frameworks selected from the group consisting of AEI, AFX, CHA, LEV, AFT, EAB, KFI, SAT, TSC, SAV, ERI, LTA and combinations thereof. In certain embodiments, the aluminosilicate zeolite crystals comprise zeolites with a CHA framework. The disclosed method can, in some embodiments, further comprise filtering and/or washing, e.g., prior to the calcining step.

In some embodiments, the aluminosilicate zeolite crystals (e.g., comprising zeolites with a CHA framework) have a zeolitic BET surface area of about 200 $m^2/g$ or more. In some embodiments, the aluminosilicate zeolite crystals (e.g., comprising zeolites with a CHA framework) have a zeolitic BET surface area ranging from about 200 $m^2/g$ to about 900 $m^2/g$. In some embodiments, the aluminosilicate zeolite crystals (e.g., comprising zeolites with a CHA framework) have a zeolitic BET surface area ranging from about 200 $m^2/g$ to about 650 $m^2/g$. In some embodiments, the aluminosilicate zeolite crystals form clusters ranging in size from about 50 nanometers to about 5 micrometers The reagents used in the disclosed method can vary. In some embodiments, the alumina source is selected from the group consisting of sodium aluminate, $Al(C_3H_7O)_3$, Al metal, water-soluble aluminum salts, aluminum oxides, aluminum hydroxides, colloidal suspensions, and combinations thereof. In some embodiments, the silica source is selected from the group consisting of colloidal silica, fumed silica, and tetraethyl orthosilicate (TEOS), sodium silicate, precipitated silica, and combinations thereof. In some embodiments, the mineralizing agent is selected from the group consisting of NaOH, KOH, F, quaternary ammonium hydroxides, and combinations thereof. In some embodiments, the organic structure directing agent is selected from the group consisting of quaternary ammonium salts, adamantyl, cyclohexyl, aromatic substituents, and combinations thereof.

In another aspect, the disclosure provides an aluminosilicate zeolite crystal provided according to any of the methods outlined herein. In a further aspect, the disclosure provides an aluminosilicate zeolite crystal prepared by adding an alumina source to a heated mixture comprising a silica source, a mineralizing agent, and an organic structure directing agent such that the added alumina source is consumed. In an additional aspect, the disclosure provides a CHA zeolite crystal prepared by adding an alumina source to a heated mixture such that the added alumina source is consumed, wherein the heated mixture comprises a silica source, a mineralizing agent, an organic structure directing agent, and CHA seeds, wherein the heated mixture and alumina source are substantially crystallized during a given time period. In a further aspect, the disclosure provides an aluminosilicate zeolite crystal prepared by forming a mixture of a silica source, a mineralizing agent, an organic structure directing agent, and aluminosilicate zeolite crystals; crystallizing the mixture at an elevated temperature and pressure; and after the elevated temperature and pressure are reached, adding the alumina source to the mixture (in-situ) over a first duration. In some aspects, the aluminosilicate zeolite crystals provided herein comprise crystalline clusters. Such crystalline clusters, in certain embodiments, have a zeolitic BET surface area of about 200 $m^2/g$ or more.

The disclosure further provides an article comprising the aluminosilicate zeolite crystals described herein. For example, in one aspect, the disclosure provides an article comprising an aluminosilicate zeolite crystal prepared by adding an alumina source to a heated mixture such that the added alumina source is consumed, wherein the mixture comprises a silica source, a mineralizing agent, and an organic structure directing agent. In another aspect, the disclosure provides an article comprising a CHA zeolite crystal prepared by adding an alumina source to a heated mixture, wherein the heated mixture comprises a silica source, a mineralizing agent, an organic structure directing agent, and CHA seeds, wherein the heated mixture and added alumina are substantially crystallized over a time period.

The present disclosure includes, without limitation, the following embodiments.

Embodiment 1

A method of crystallizing zeolites, comprising: preparing a mixture comprising a silica source, a mineralizing agent, an organic structure directing agent, and optionally, zeolite crystals; heating the mixture to form a heated mixture; and adding an alumina source to the heated mixture.

Embodiment 2

The method of the preceding embodiment, wherein the heating step is conducted, at least in part, at elevated pressure (e.g., at a pressure of at least 1 atmosphere).

Embodiment 3

The method of any preceding embodiment, wherein the mixture is at elevated pressure (e.g., at a pressure of at least 1 atmosphere) before the adding step.

Embodiment 4

The method of any preceding embodiment, wherein the heated mixture comprises about 75 wt. % or less, about 50 wt. % or less, about 25% or less, about 10% or less, or about 5% or less of alumina source in the heated mixture prior to the adding step, based on a total amount of alumina source employed in the method.

Embodiment 5

The method of any preceding embodiment, wherein the heated mixture is free of alumina prior to the adding step, other than alumina in the optional zeolite crystals.

Embodiment 6

The method of any preceding embodiment, wherein the mixture comprises the optional zeolite crystals (e.g., as seed crystals), and wherein the zeolite crystals have an 8 ring pore size.

Embodiment 7

The method of any preceding embodiment, wherein the alumina source is added continuously at a constant flow rate.

Embodiment 8

The method of any preceding embodiment, wherein the alumina source is added continuously at varying flow rates, continuously at an increasing flow rate, continuously at a decreasing flow rate, or instantaneously.

Embodiment 9

The method of any preceding embodiment, wherein the method provides a substantially crystallized product in a time period that is less than a comparative time period required to provide a substantially crystallized product in a control process comprising combining the alumina source with the silica source in an amount of about 80 wt. % or more, based on a weight of a total amount of alumina source to be added, mineralizing agent, organic structure directing agent, and optional zeolite crystals Embodiment 10

The method of any preceding embodiment, wherein the time period is about 1.5 times shorter than the comparative time period.

Embodiment 11

The method of any preceding embodiment, wherein the time period is about 2 times shorter than the comparative time period.

Embodiment 12

The method of any preceding embodiment, wherein the time period is about 3 times shorter than the comparative time period.

Embodiment 13

The method of any preceding embodiment, wherein the time period is the time required to obtain about 80% or more crystallinity from the mixture and the alumina source.

Embodiment 14

The method of any preceding embodiment, wherein the time period is the time required to obtain about 85% or more crystallinity from the mixture and the alumina source.

Embodiment 15

The method of any preceding embodiment, wherein the time period is the time required to obtain about 90% or more crystallinity from the mixture and the alumina source.

Embodiment 16

The method of any preceding embodiment, wherein the time period is the time required to obtain about 95% or more crystallinity from the mixture and the alumina source.

Embodiment 17

The method of any preceding embodiment, wherein the adding step is conducted during about 10% to about 100% of the time period.

Embodiment 18

The method of any preceding embodiment, wherein the adding step is conducted during about 30% to about 100% of the time period.

Embodiment 19

The method of any preceding embodiment, wherein the adding step is conducted during about 50% to about 100% of the time period, during about 70% to about 100% of the time period, or during about 85% of the time period.

Embodiment 20

The method of any preceding embodiment, wherein the time period ranges from about 1 hour to about 96 hours, from about 2 hours to about 72 hours, from about 3 hours to about 48 hours, from about 5 hours to about 36 hours, from about 6 hours to about 24 hours, from about 7 hours to about 12 hours, or about 10 hours.

Embodiment 21

The method of any preceding embodiment, wherein the comparative time period ranges from about 3 hours to about 168 hours, from about 10 hours to about 96 hours, from about 15 hours to about 72 hours, from about 20 hours to about 48 hours, or about 30 hours.

Embodiment 22

The method of any preceding embodiment, further comprising calcining to form aluminosilicate zeolite crystals with an 8 ring pore size.

Embodiment 23

The method of any preceding embodiment, wherein the aluminosilicate zeolite crystals comprise zeolites with frameworks selected from the group consisting of AEI, AFX, CHA, LEV, AFT, EAB, KFI, SAT, TSC, SAV, ERI, LTA and combinations thereof.

Embodiment 24

The method of any preceding embodiment, wherein the aluminosilicate zeolite crystals comprise zeolites with a CHA framework.

Embodiment 25

The method of any preceding embodiment, wherein the aluminosilicate zeolite crystals have a zeolitic BET surface area ranging from about 200 $m^2/g$ to about 900 $m^2/g$.

Embodiment 26

The method of any preceding embodiment, wherein the aluminosilicate zeolite crystals have a zeolitic BET surface area of at least about 200 $m^2/g$ or ranging from about 200 $m^2/g$ to about 650 $m^2/g$.

Embodiment 27

The method of any preceding embodiment, wherein the aluminosilicate zeolite crystals form clusters ranging in size from about 50 nanometers to about 5 micrometers.

Embodiment 28

The method of any preceding embodiment, wherein the alumina source is selected from the group consisting of sodium aluminate, $Al(C_3H_7O)_3$, Al metal, water-soluble aluminum salts, aluminum oxides, aluminum hydroxides, colloidal suspensions, and combinations thereof.

Embodiment 29

The method of any preceding embodiment, wherein the silica source is selected from the group consisting of colloidal silica, fumed silica, and tetraethyl orthosilicate (TEOS), sodium silicate, precipitated silica, and combinations thereof.

Embodiment 30

The method of any preceding embodiment, wherein the mineralizing agent is selected from the group consisting of NaOH, KOH, F, quaternary ammonium hydroxides, and combinations thereof.

Embodiment 31

The method of any preceding embodiment, wherein the organic structure directing agent is selected from the group consisting of quaternary ammonium salts, adamantyl, cyclohexyl, aromatic substituents, and combinations thereof.

Embodiment 32

The method of any preceding embodiment, wherein the mixture comprises the optional zeolite crystals, and wherein the optional zeolite crystals are aluminosilicate zeolite crystal seeds with an 8 ring pore size, having structures selected from the group consisting of AEI, AFX, CHA, LEV, AFT, EAB, KFI, SAT, TSC, SAV, ERI, LTA and combinations thereof.

Embodiment 33

The method of any preceding embodiment, wherein the aluminosilicate zeolite crystals with an 8 ring pore size have a CHA structure.

Embodiment 34

The method of any preceding embodiment, wherein the heated mixture and added alumina are substantially crystallized during the time period.

Embodiment 35

An aluminosilicate zeolite crystal prepared according to any preceding embodiment.

Embodiment 36

An article comprising the aluminosilicate zeolite crystal of the preceding embodiment.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION OF THE INVENTION

Figure 1:
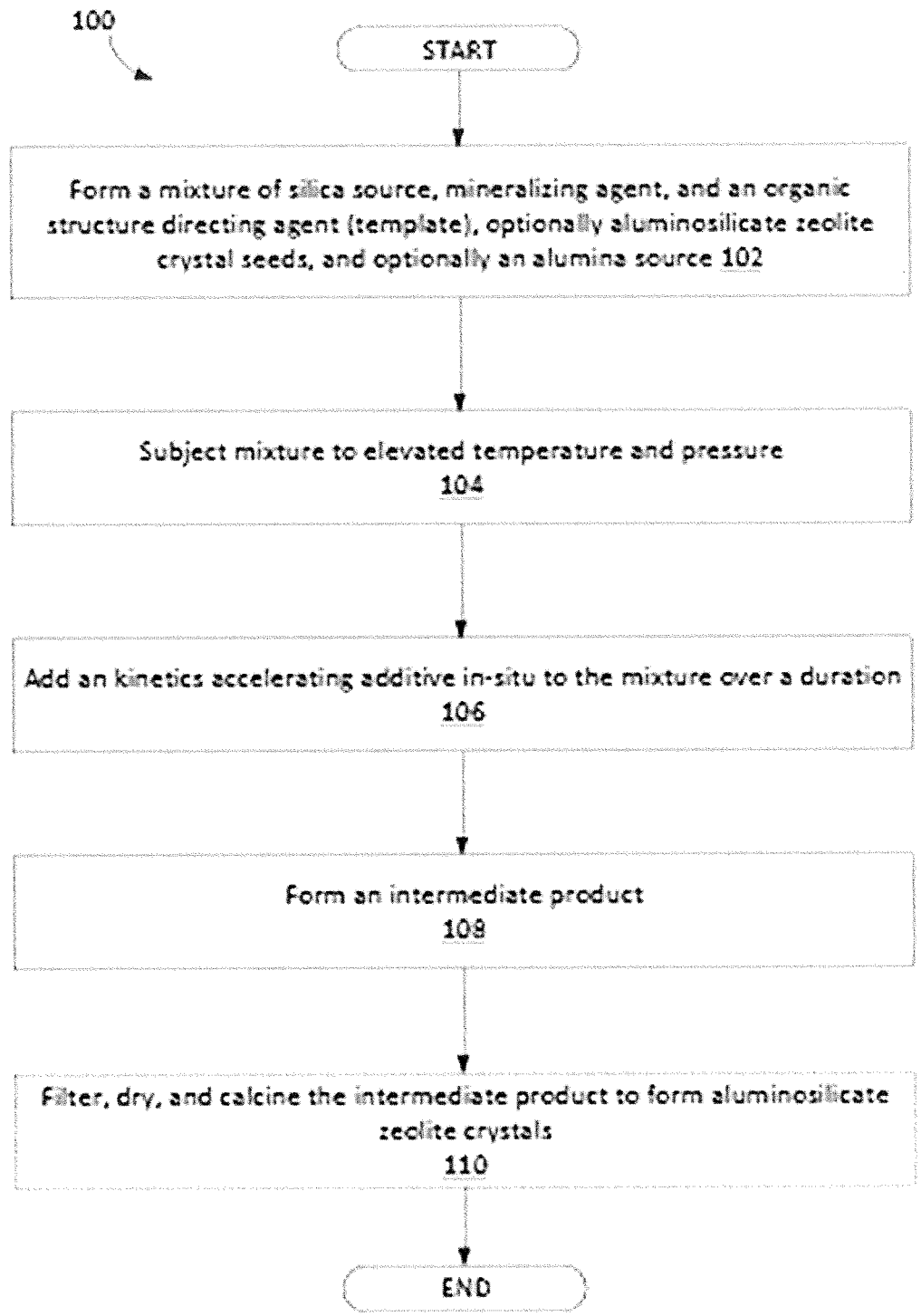
FIG. 1 illustrates a process for preparing aluminosilicate zeolite crystals according to an embodiment of the invention.

The present disclosure relates to processes for an accelerated preparation of aluminosilicate zeolite crystals. In commercial operations, accelerated aluminosilicate zeolite crystallization may lead to higher throughput and efficiency.

Definitions and Measurements

The terms "adding an alumina source continuously" or "adding an alumina source in-situ" refer to adding an alumina source during the crystallization process. The addition may be instantaneous or over a duration that is about 10% or more, about 20% or more, about 30% or more, about 40% or more, or about 50% or more of the total crystallization time. The addition may begin at various time points during the total crystallization time (referred to herein as the "time period"). For instance, for an addition time that is 50% of the total crystallization time in duration, the addition may occur at the beginning of the crystallization (e.g., 0-50% of total crystallization time), at the end of the crystallization (e.g., 50-100% of total crystallization time), or at some time point in the middle of the crystallization (e.g., 30-80% of total crystallization).

The addition may be interrupted or uninterrupted. An example of an interrupted addition is when for an addition time that is 50% of the total crystallization time in duration, half of the alumina source for continuous addition is added over 25% of the total crystallization time at the beginning of the crystallization, and another half of the alumina source for continuous addition may be added over 25% of the total crystallization time at the end of the crystallization. The gap between interrupted additions may range from seconds to minutes, hours, or days, depending on the total crystallization time.

Composition crystallinity may be measured by X-ray Diffraction. The samples were ground using a mortar and pestle and then backpacked into a flat mount sample holder. A PANalytical MPD X'Pert Pro diffraction system was used for data collection. A copper anode tube (Wavelength: Cu K$\alpha$1=1.54060 Å) was operated at 45 kV and 40 mA. The Bragg-Brentano configuration was employed, and data was acquired from 3° to 80° 2θ with a step size of 0.016° and a count-time of 60 s/step. Phase identification and peak fitting was done using Jade Plus software version 9.5.0 and the PDF-4+ 2015 (powder diffraction file) database from the ICDD (International Center for Diffraction Data). Rietveld refinements were performed using Bruker AXS Topas software version 4.2.

Zeolite BET surface area analysis and nitrogen pore size distribution were analyzed on Micromeritics TriStar 3000 series instruments. The samples were degassed for a total of 6 hours (a 2 hour ramp up to 300° C. then held at 300° C. for 4 hours, under a flow of dry nitrogen) on a Micromeritics SmartPrep degasser. Nitrogen BET surface area is determined using 5 partial pressure points between 0.08 and 0.20. Nitrogen pore size (BJH) is determined using 33 desorption points.

Process for Preparing an Aluminosilicate Zeolite Crystal Composition

In some embodiments, the process 100 for preparing the aluminosilicate zeolite crystal composition illustrated in FIG. 1 comprises forming a mixture of a silica source, a mineralizing agent, an organic structure directing agent (template), optionally aluminosilicate zeolite crystal seeds, and optionally an alumina source in accordance with block 102. The mixture may then be subjected to hydrothermal conditions, i.e., elevated temperature of about 100° C. or more and/or elevated pressure, in accordance with block 104. Once hydrothermal conditions are reached, the process may further comprise adding an additive that may accelerate the crystallization kinetics to the mixture in-situ over a first duration, in accordance with block 106. Exemplary kinetics accelerating additives include an alumina source, silica, an organic structure directing agent, other compounds, and combinations thereof. During the in-situ addition of the kinetics accelerating additive, such as alumina source, the additive may get consumed, thereby forming an intermediate product over a second duration, in accordance with block 108. At the end of the crystallization, the intermediate product may optionally be filtered, dried, and calcined to form aluminosilicate zeolite crystals, in accordance with block 110.

The first duration of the additive addition, such as alumina source addition, may run simultaneously with the second duration. In some embodiments, the second duration defines the total crystallization time to obtain aluminosilicate zeolite crystals. In some embodiments, the first duration is equal in length to the second duration. The first duration of continuous additive addition may occur instantaneously, during about 1%, about 3%, about 5%, about 7%, about 10%, about 20%, about 30%, about 40%, about 50%, about 60%, or about 70% to about 75%, about 85%, about 90%, about 95%, or about 100% of the total crystallization time. For instance, the first duration may be instantaneous, or may range in length from about 1% to about 100%, from about 10% to about 100%, from about 30% to about 100%, from about 50% to about 100%, from about 70% to about 100%, or about 85% of the second duration. For example, if the total crystallization time (second duration) is 30 hours, continuous alumina source addition over a duration that is 85% of the total crystallization time would constitute adding the alumina over 25.5 hours out of the 30 hours of total crystallization time.

The total crystallization time for the accelerated crystallization processes disclosed herein may range from about 1 hour, about 2 hours, about 3 hours, about 4 hours, about 5 hours, about 6 hours, about 7 hours, or about 8 hours to about 10 hours, about 12 hours, about 15 hours, about 20 hours, about 24 hours, about 25 hours, about 30 hours, about 36 hours, about 48 hours, about 72 hours, or about 96 hours.

In some embodiments, the crystallization process comprises adding an alumina source in-situ to a heated mixture such that the added alumina source is consumed to form an intermediate product. Prior to the start of crystallization and alumina source consumption, the mixture may comprise a silica source, a mineralizing agent, and an organic structure directing agent.

In some embodiments, a portion of the alumina source may be present in the mixture prior to initiating the in-situ addition of the alumina source. If the alumina source is present initially in any of the accelerated processes described herein, its concentration in the mixture prior to initiating the in-situ addition of the alumina source may be about 75 wt. % or less, about 50 wt. % or less, about 25 wt. % or less, about 10 wt. % or less, about 5 wt. % or less, or the mixture may be substantially free of the alumina source altogether. All wt. % values referenced are based on weight of the total alumina source to be added to the mixture during the complete zeolite crystallization process.

The remaining alumina source, i.e., alumina source which was not already present in the mixture prior to initiating the in-situ addition of alumina source, may be added continuously at a constant flow rate. Alternatively, the remaining alumina source may be added continuously at varying flow rates. For example, the alumina source may be added continuously at an increasing or at a decreasing flow rate. The remaining alumina source in other embodiments is added instantaneously (i.e., largely at the same time, as a single, fast addition).

The heated mixture and in-situ added alumina source may be substantially crystallized during a crystallization time (also referred to herein as a "time period"). This crystallization time may be shorter than the crystallization time required to substantially crystallize a mixture comprising a silica source, a mineralizing agent, an organic structure directing agent, and an alumina source in an amount of about 80 wt. % or more, based on weight of the total alumina source to be added during the second crystallization, prior to the start of the comparative crystallization time.

The heated mixture and in-situ added alumina source crystallized during the crystallization time ("time period") may be referred to herein as the "first mixture" or the "first crystallization process." The comparative mixture and comparative crystallization time may be referred to the herein as the "comparative mixture" or the "comparative crystallization process." The first mixture and the comparative mixture referenced herein are assumed to have identical compositions except for the time at which the alumina source is added to the mixtures. In the first crystallization process, about 25 wt. % or more, about 50 wt. % or more, about 75 wt. % or more, about 90 wt. % or more, about 95 wt. % or more, or about 100 wt. % of the alumina source is added to the first mixture in-situ instead of upfront prior to initiating the crystallization and addition of the alumina source and prior to attainment of hydrothermal conditions in the vessel, e.g., pressure vessel (all wt. % values being based on weight of the total alumina source to be added during the first crystallization process). In the comparative crystallization process, about 80 wt. % or more, about 85 wt. % or more, about 90 wt. % or more, about 95 wt. % or more, or about 100 wt. % of the alumina source is added to the comparative mixture upfront prior to crystallization and attainment of hydrothermal conditions in the vessel, e.g., pressure vessel (all wt. % values being based on weight of the total alumina source to be added during the comparative crystallization process).

The first crystallization time may be about 1.5 times, about 2 times, about 2.5 times, about 3 times, about 3.5 times, about 4 times, about 4.5 times, or about 5 times shorter than the comparative crystallization time. The first crystallization time for the accelerated crystallization processes disclosed herein may range from about 1 hour, about 2 hours, about 3 hours, about 4 hours, about 5 hours, about 6 hours, about 7 hours, or about 8 hours to about 10 hours, about 12 hours, about 15 hours, about 20 hours, about 24 hours, about 25 hours, about 30 hours, about 36 hours, about 48 hours, about 72 hours, or about 96 hours. The comparative crystallization time may range from about 3 hours, about 5 hours, about 10 hours, about 15 hours, about 20 hours, about 25 hours, or about 30 hours to about 40 hours, about 45 hours, about 48 hours, about 60 hours, about 72 hours, about 96 hours, about 168 hours, about 180 hours, about 240 hours, about 360 hours, or about 480 hours.

The term "total crystallization time," "first crystallization time," "comparative crystallization time," or "substantially crystallized" refer to herein as the time required to obtain about 80% or more, about 85% or more, about 90% or more, about 92% or more, about 94% or more, about 96% or more, about 98% or more, or about 99% or more crystallinity from the mixture and the alumina source (regardless of whether the alumina source is added entirely upfront, added in-situ during the crystallization, or added partially upfront and partially in-situ during the crystallization). For instance, the first crystallization time is the time required to substantially crystallize the first mixture with the in-situ added alumina source and the comparative crystallization time is the time required to substantially crystallize the comparative mixture.

Aluminosilicate Zeolite Crystals and Crystallization Components

The alumina sources may be independently selected from the group consisting of sodium aluminate, $Al(C_3H_7O)_3$, Al metal, water-soluble aluminum salts, aluminum oxides, aluminum hydroxides, colloidal suspensions, and combinations thereof.

The silica source may be selected from the group consisting of colloidal silica, fumed silica, and tetraethyl orthosilicate (TEOS), sodium silicate, precipitated silica, and combinations thereof.

The mineralizing agent may be selected from the group consisting of NaOH, KOH, F, quaternary ammonium hydroxides, and combinations thereof.

The organic structure directing agent (template) may be selected from the group consisting of quaternary ammonium salts. Examples include quaternary ammonium cations with substituents selected from the group consisting of alkyl, adamantyl, cyclohexyl, aromatic, and combinations thereof.

In some embodiments, aluminosilicate zeolite crystals resulting from the accelerated crystallization process have a uniform distribution of a silica to alumina ratio (SAR). Alternatively, the aluminosilicate zeolite crystals resulting from the accelerated crystallization process may show a depth-dependent silica to alumina ratio gradient. For example, the silica to alumina ratio may range from about 1, about 2, about 5, about 8, about 10, about 15, about 20 or about 25 to about 30, about 35, about 40, about 45, about 50, about 60, about 70, about 80 about 90, about 100, about 150, about 200, about 260, about 300, about 400, about 500, about 750 or about 1000.

If the aluminosilicate zeolite crystals resulting from the accelerated crystallization process show a depth-dependent silica to alumina ratio gradient, the material may be characterized by a surface silica to alumina ratio and an internal silica to alumina ratio, wherein the surface silica to alumina ratio may be lower than the internal silica to alumina ratio.

In some embodiments, the aluminosilicate zeolite crystals resulting from the accelerated crystallization process may have a zeolitic BET surface area of about 200 $m^2/g$ or more, about 400 $m^2/g$ or more, or about 450 $m^2/g$ or more. In certain embodiments, the composition may have a zeolitic BET surface area ranging from about 200 $m^2/g$ to about 900 $m^2/g$, from about 400 $m^2/g$ to about 900 $m^2/g$, from about 450 $m^2/g$ to about 900 $m^2/g$, from about 200 $m^2/g$ to about 750 $m^2/g$, from about 400 $m^2/g$ to about 750 $m^2/g$, from about 450 $m^2/g$ to about 750 $m^2/g$, from about 200 $m^2/g$ to about 600 $m^2/g$, from about 400 $m^2/g$ to about 600 $m^2/g$, from about 200 $m^2/g$ to about 550 $m^2/g$, or from about 450 $m^2/g$ to about 550 $m^2/g$.

In some embodiments, the aluminosilicate zeolite crystals resulting from the accelerated crystallization process may form clusters having a crystal size of up to about 10 μm, or ranging from about 50 nm to about 5 μm, from about 0.1 m to about 10 μm, from about 0.1 m to about 8 μm, from about 0.1 μm to about 6 μm, from about 0.1 m to about 5 μm, from about 0.1 m to about 4 μm, from about 0.1 μm to about 3 μm, from about 0.5 μm to about 3 μm, from about 0.1 μm to about 2 μm, from about 0.1 m to about 1 μm, from about 0.1 m to about 0.5 μm, from about 1 μm to about 10 μm, from about 1 μm to about 8 μm, from about 1 μm to about 6 μm, from about 1 μm to about 5 μm, from about 1 μm to about 4 μm, from about 1 μm to about 3 μm, from about 1 μm to about 2 μm, or about 1 μm.

The various aluminosilicate zeolite crystal compositions and aluminosilicate zeolite crystal seeds described herein can comprise an 8 ring pore size and can have frameworks selected from the group consisting of AEI, AFX, CHA, LEV, AFT, EAB, KFI, SAT, TSC, SAV, ERI, LTA and combinations thereof. In one embodiment, the aluminosilicate zeolite crystal compositions and/or aluminosilicate zeolite crystal seeds comprise zeolites with a CHA frameworks.

The zeolite crystal compositions disclosed herein can be incorporated within articles, e.g., catalytic articles.

EXAMPLES

The following examples are set forth to assist in understanding the embodiments described herein and should not be construed as specifically limiting the embodiments described and claimed herein. Such variations, including the substitution of all equivalents now known or later developed, which would be within the purview of those skilled in the art, and changes in formulation or minor changes in experimental design, are to be considered to fall within the scope of the embodiments incorporated herein.

Figure 2:
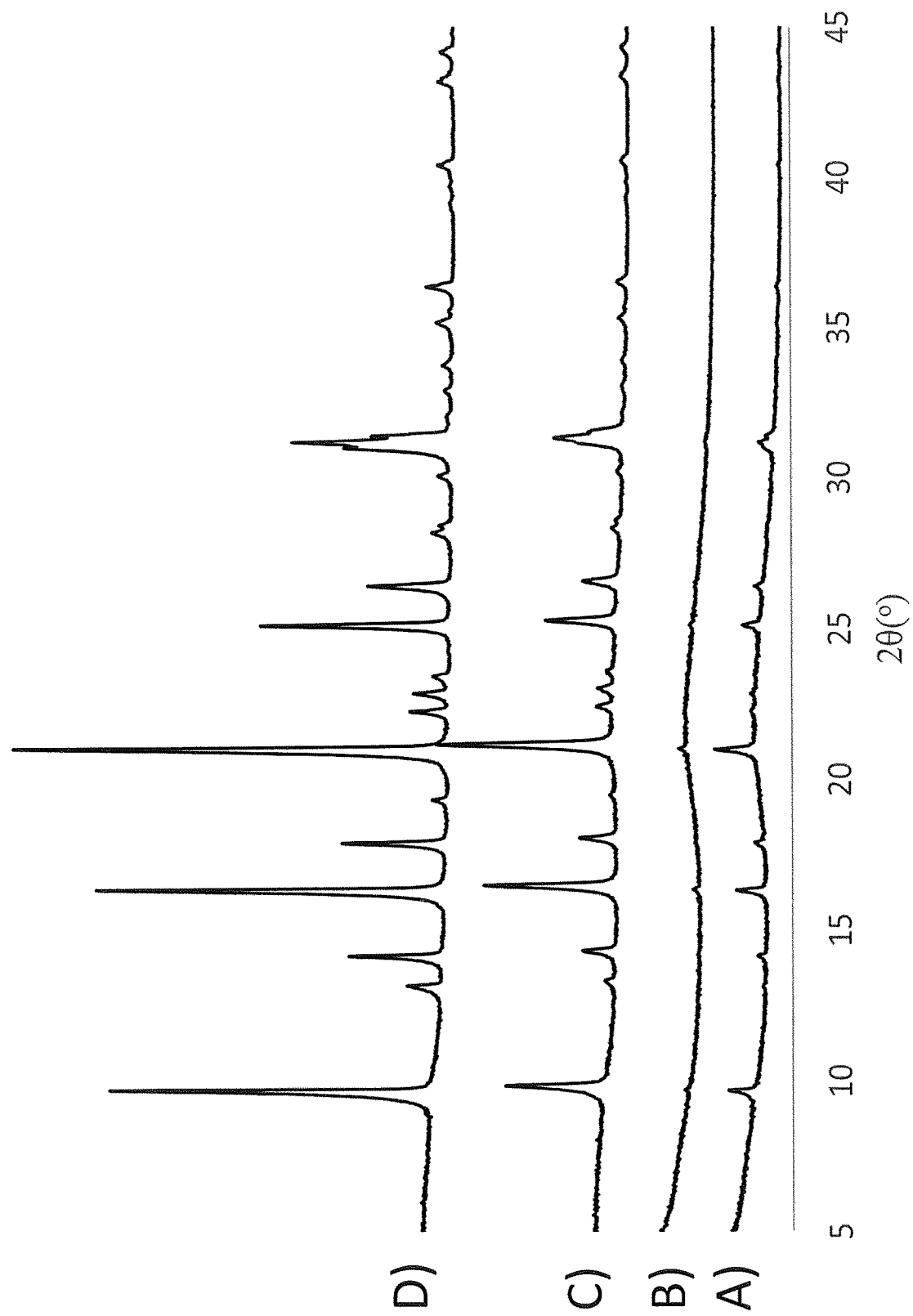
FIG. 2 depicts X-Ray Diffraction (XRD) patterns comparing the crystallinity of aluminosilicate zeolite crystal products resulting from delayed addition of alumina source in seeded and unseeded crystallizations.

Comparative Example 1: Without Delayed In-Situ Addition of an Alumina Source and a 10 Hour Unseeded Crystallization—FIG. 2, Pattern A An aluminosilicate gel with a nominal silica to alumina ratio (SAR) of 32 was prepared by the following procedure. First, 0.17 g of 50 wt. % aq. NaOH solution, 20.0 g of deionized water, 27.97 g of 9.75 wt. % sodium aluminate solution and 26.41 g of 25 wt. % aq. solution of trimethyladamantylammonium hydroxide were combined and stirred for 1 hour at 25° C. To this mixture 65.29 g of 40 wt. % colloidal silica were added, and the resulting gel was stirred for an additional 30 minutes before loading into a 600 mL stirred autoclave reactor. The gel was crystallized at 170° C. under autogenous pressure for 10 h (8 h temperature ramp).

After cooling to room temperature, the crystalline material was filtered, washed with deionized water, dried (12 h 90° C.) and calcined (6 h 540° C.) to obtain the zeolite product. The X-ray diffraction pattern of the product (FIG. 2, pattern A) showed only traces of a CHA product.

Example 2: Delayed Continuous Addition of an Alumina Source and a 10 Hour Unseeded Crystallization—FIG. 2, Pattern B An aluminosilicate gel analogous to that of Comparative Example 1 was prepared without sodium aluminate addition. After reaching the crystallization temperature of 170° C., the sodium aluminate solution described in Example 1 was added continually via HPLC pump, for the first 8.55 h (0.05 mL/min) of a 10 hour crystallization. The product was recovered and calcined as described in Example 1. The X-ray diffraction pattern of the product (FIG. 2, pattern B) showed an amorphous material.

Example 3: Without Delayed In-Situ Addition of an Alumina Source and a 10 Hour Seeded Crystallization—FIG. 2, Pattern C An aluminosilicate gel analogous to that of Comparative Example 1 was prepared with addition of 1.35 g standard, calcined and/or non-calcined CHA crystals. The resulting product was crystallized and recovered as in Example 1. The X-ray diffraction pattern of the product (FIG. 2, pattern C) corresponded to CHA with 61% crystallinity. A zeolitic surface area of 347 $m^2/g$ was measured.

Figure 3B:
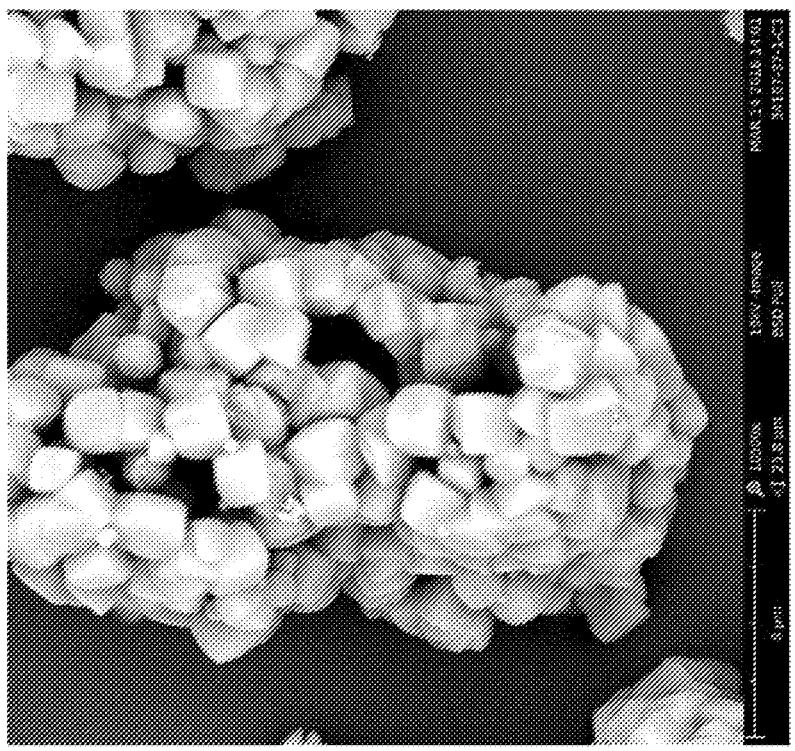
FIGS. 3A and 3B depict images resulting from Scanning Electron Microscopy (SEM) of aluminosilicate zeolite crystal structures prepared: (A) in accordance with the standard process and (B) in accordance with embodiments of the invention.

Example 4: With Delayed In-Situ Addition of an Alumina Source and a 10 Hour Seeded Crystallization—FIG. 2, Pattern D and FIG. 3B An aluminosilicate gel analogous to that of Example 2 was prepared with addition of 1.35 g standard, non-calcined CHA crystals. The crystallization, addition of sodium aluminate solution and isolation of product were performed as in Example 2. The X-ray diffraction pattern of the product (FIG. 2, pattern D) corresponded to CHA with 96% crystallinity. The product had a zeolitic surface area of 559 $m^2/g$ and a micrograph is shown in FIG. 3B.

Figure 3A:
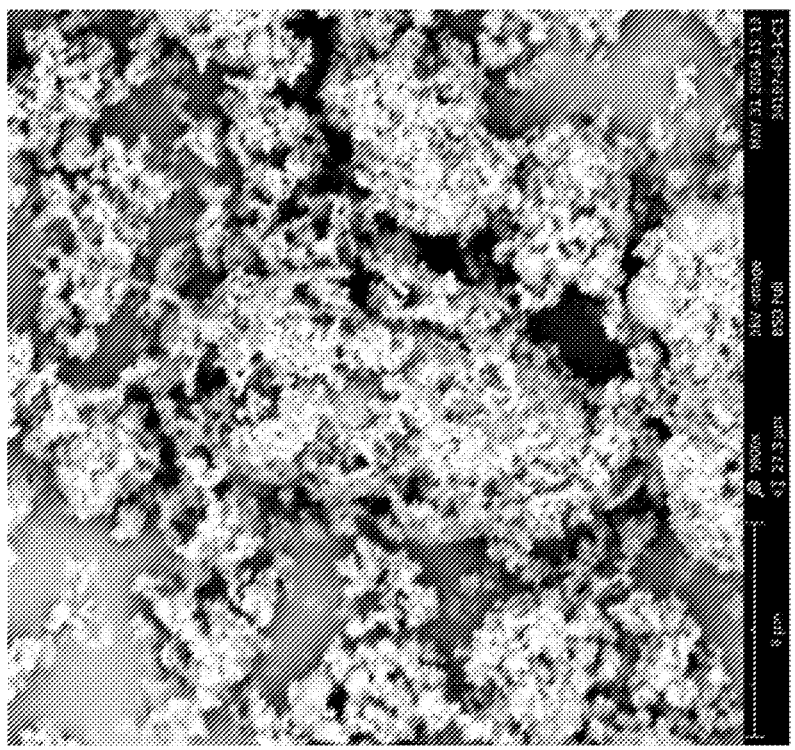

Example 5: Without Delayed In-Situ Addition of an Alumina Source and a 30 Hour Seeded Crystallization—FIG. 3A An aluminosilicate gel analogous to that of Example 3 was crystallized for 30 hr. at 170° C. The resulting product had a zeolitic surface area of 473 $m^2/g$ and a micrograph is shown in FIG. 3A.

Example 6: Selective Catalytic Reduction Activity—FIG. 4

Figure 4:
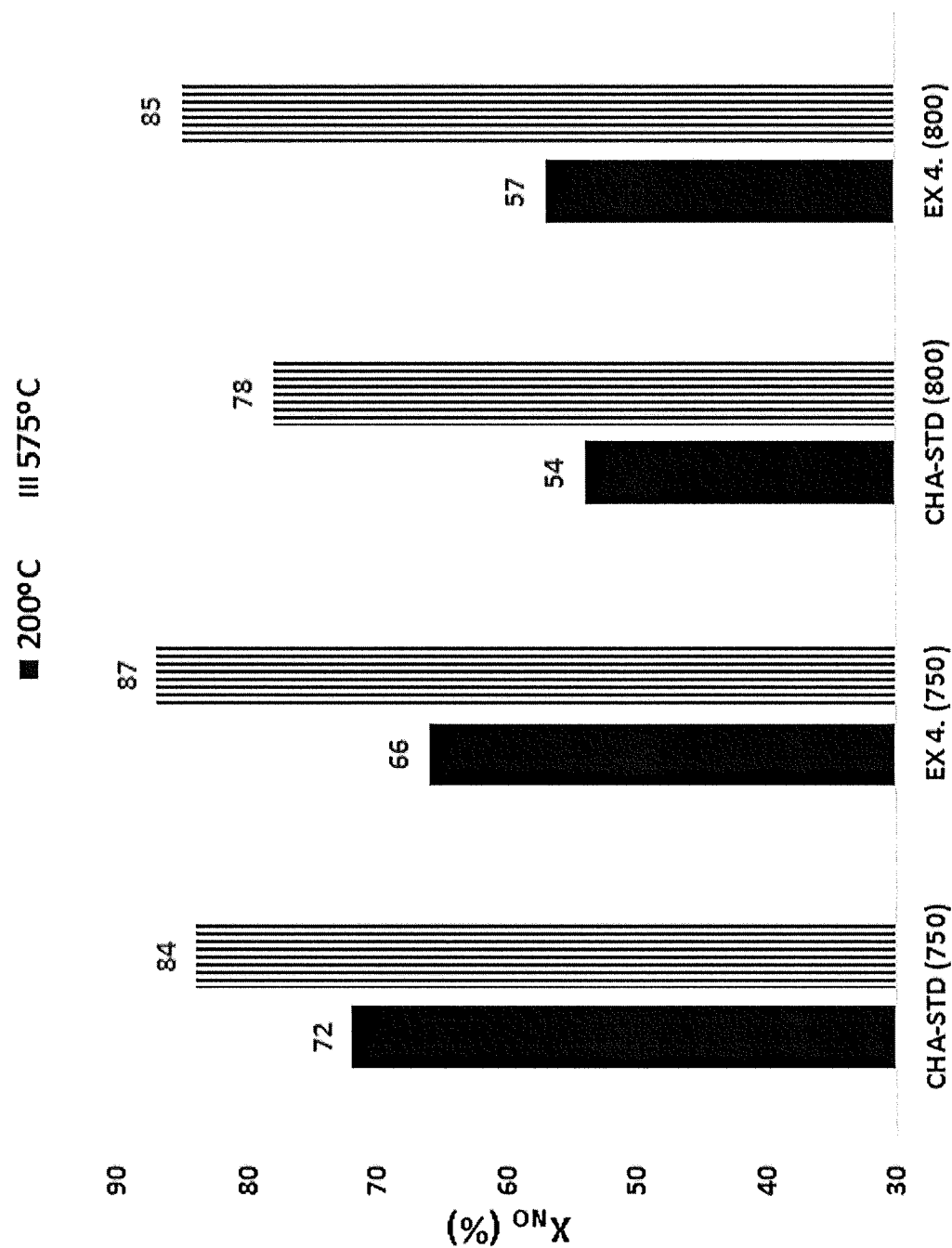
FIG. 4 illustrates comparative selective catalytic reduction performance between aluminosilicate zeolite crystals prepared in accordance with the standard process and aluminosilicate zeolite crystals prepared in accordance with embodiments of the invention.

Prior to Selective Catalytic Reduction (SCR) testing, the product of Example 4 was $NH_4^+$ exchanged (80° C.) at a ratio of 10:1 $NH_4NO_3$, dried (12 h 90° C.) and calcined (6 h 540° C.) to obtain the $H^+$ form of the material, which was impregnated with $Cu(NO_3)_2$ solution to achieve a loading of 3.25% CuO and calcined at 540° C. Subsequently, the materials were slurried with and without $ZrO(OAc)_2$ binder (5 wt. % $ZrO_2$) and dried under stirring. A standard Cu-CHA material with a similar CuO loading was used as a reference (CHA-STD). Prior to SCR testing, the samples were aged at 750° C. for 5 h or 800° C. for 16 h in 10% $H_2O$ in static air. Samples were tested as 120 mg Cu-CHA per reactor diluted with corundum of the same sieve fraction to ~1 mL bed volume. The SCR reaction was carried out at the following conditions:

Feed: GHSV 80000 h-1, 500 ppm NO, 500 ppm $NH_3$, 5% $H_2O$, 10% $O_2$, balance $N_2$ Temperature: 175, 200, 250, 575° C. (first run for degreening) 175, 200, 225, 250, 500, 550, 575° C. Results from the second run are shown in FIG. 4.

The use of the terms "a," "an," "the," and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Reference throughout this specification to "one embodiment," "certain embodiments," "one or more embodiments" or "an embodiment" means that a particular feature, structure, material, or characteristic described in connection with the embodiment is included in at least one embodiment of the present disclosure. Thus, the appearances of the phrases such as "in one or more embodiments," "in certain embodiments," "in some embodiments," "in one embodiment," or "in an embodiment" in various places throughout this specification are not necessarily referring to the same embodiment of the present disclosure. Furthermore, the particular features, structures, materials, or characteristics may be combined in any suitable manner in one or more embodiments.

Although the embodiments disclosed herein have been described with reference to particular embodiments it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents, and the above-described embodiments are presented for purposes of illustration and not of limitation.

What is claimed is:

1. A method of crystallizing zeolites, comprising:
preparing a mixture comprising a silica source, a mineralizing agent, an organic structure directing agent, and zeolite crystals;
heating the mixture to form a heated mixture; and
adding an alumina source to the heated mixture,
wherein the heated mixture comprises about 75 wt. % or less of alumina source in the heated mixture prior to the adding step, based on a total amount of alumina source employed in the method.

2. The method of claim 1, wherein the heating is conducted, at least in part, at a pressure of at least 1 atmosphere.

3. The method of claim 1, wherein the heated mixture is free of alumina prior to the adding step, other than alumina in the zeolite crystals.

4. The method of claim 1 wherein the zeolite crystals have an 8 ring pore size.

5. The method of claim 1, wherein the alumina source is added continuously at a constant flow rate.

6. The method of claim 1, wherein the method provides a product having about 80% or more crystallinity in a time period that is less than a comparative time period required to provide a product having about 80% or more crystallinity in a control process, wherein the control process is substantially identical except wherein the heated mixture comprises the alumina source in an amount of about 80 wt. % or more, based on a weight of a total amount of alumina source to be added, the silica source, mineralizing agent, organic structure directing agent, and zeolite crystals.

7. The method of claim 6, wherein the time period is about 1.5 times shorter than the comparative time period.

8. The method of claim 6, wherein the time period is about 2 times shorter than the comparative time period.

9. The method of claim 6, wherein the time period is about 3 times shorter than the comparative time period.

10. The method of claim 6, wherein the time period is the time required to obtain about 85% or more crystallinity from the mixture and the alumina source.

11. The method of claim 6, wherein the time period is the time required to obtain about 90% or more crystallinity from the mixture and the alumina source.

12. The method of claim 6, wherein the time period is the time required to obtain about 95% or more crystallinity from the mixture and the alumina source.

13. The method of claim 6, wherein the adding step is conducted during about 10% to about 100% of the time period.

14. The method of claim 6, wherein the adding step is conducted during about 30% to about 100% of the time period.

15. The method of claim 6, wherein the time period ranges from about 1 hour to about 96 hours.

16. The method of claim 6, wherein the comparative time period ranges from about 3 hours to about 168 hours.

17. The method of claim 1, further comprising calcining to form aluminosilicate zeolite crystals with an 8 ring pore size.

18. The method of claim 17, wherein the aluminosilicate zeolite crystals comprise zeolites with frameworks selected from the group consisting of AEI, AFX, CHA, LEV, AFT, EAB, KFI, SAT, TSC, SAV, ERI, LTA and combinations thereof.

19. The method of claim 17, wherein the aluminosilicate zeolite crystals comprise zeolites with a CHA framework.

20. The method of claim 17, wherein the aluminosilicate zeolite crystals have a zeolitic BET surface area ranging from about 200 m2/g to about 900 m2/g.

21. The method of claim 17, wherein the aluminosilicate zeolite crystals form clusters ranging in size from about 50 nanometers to about 5 micrometers.

22. The method of claim 1, wherein the alumina source is selected from the group consisting of sodium aluminate, Al(C3H7O)3, Al metal, water-soluble aluminum salts, aluminum oxides, aluminum hydroxides, colloidal suspensions, and combinations thereof.

23. The method of claim 1, wherein the silica source is selected from the group consisting of colloidal silica, fumed silica, and tetraethyl orthosilicate (TEOS), sodium silicate, precipitated silica, and combinations thereof.

24. The method of claim 1, wherein the mineralizing agent is selected from the group consisting of NaOH, KOH, F—, quaternary ammonium hydroxides, and combinations thereof.

25. The method of claim 1, wherein the organic structure directing agent is selected from the group consisting of quaternary ammonium salts, adamantyl, cyclohexyl, aromatic substituents, and combinations thereof.

26. The method of claim 1, wherein the zeolite crystals are aluminosilicate zeolite crystal seeds with an 8 ring pore size, having structures selected from the group consisting of AEI, AFX, CHA, LEV, AFT, EAB, KFI, SAT, TSC, SAV, ERI, LTA and combinations thereof.

27. The method of claim 26, wherein the aluminosilicate zeolite crystals with an 8 ring pore size have a CHA structure.

28. The method of claim 1, wherein the heated mixture comprises about 50 wt. % or less of alumina source in the heated mixture prior to the adding step, based on a total amount of alumina source employed in the method.

29. The method of claim 1, wherein the heated mixture comprises about 25 wt. % or less of alumina source in the heated mixture prior to the adding step, based on a total amount of alumina source employed in the method.

30. The method of claim 1, wherein the heated mixture comprises about 5 wt. % or less of alumina source in the heated mixture prior to the adding step, based on a total amount of alumina source employed in the method.

* * * * *